April 10, 1934.					E. S. PORTER					1,953,986
FILM MAGAZINE FOR CAMERAS
Filed May 29, 1930					2 Sheets-Sheet 1

INVENTOR.
Edwin S. Porter
BY Austin + Dix
ATTORNEYS.

April 10, 1934.    E. S. PORTER    1,953,986
FILM MAGAZINE FOR CAMERAS
Filed May 29, 1930    2 Sheets-Sheet 2
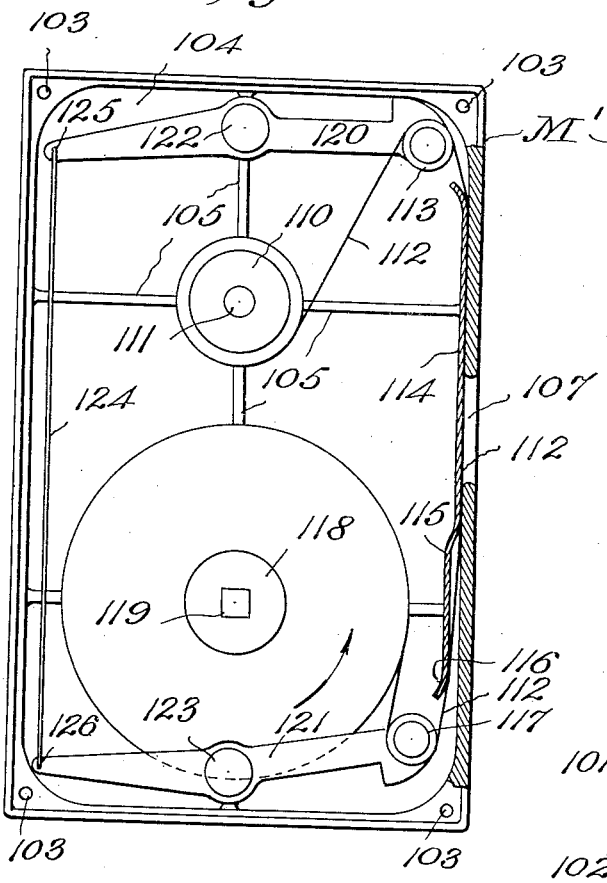
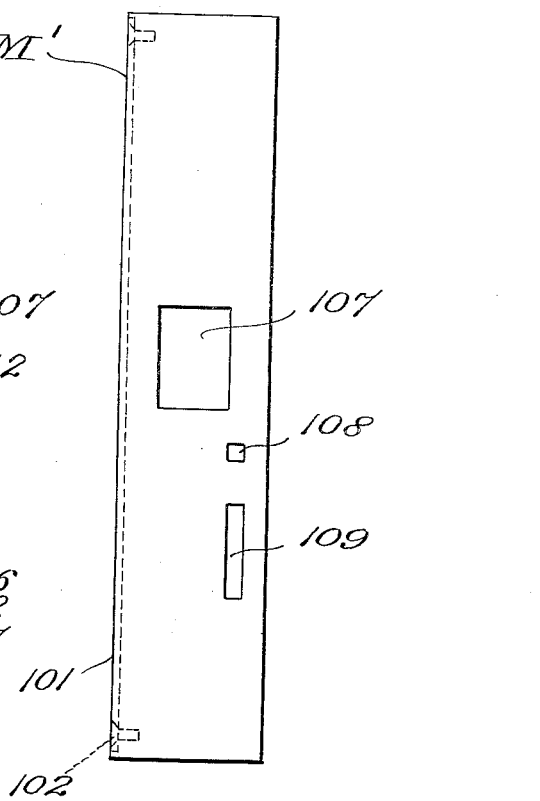
*INVENTOR.*
Edwin S. Porter
BY
Austin & Dix
*ATTORNEYS.*

Patented Apr. 10, 1934

1,953,986

UNITED STATES PATENT OFFICE 1,953,986

FILM MAGAZINE FOR CAMERAS

Edwin Stanton Porter, New York, N. Y.

Application May 29, 1930, Serial No. 456,910

11 Claims. (Cl. 88—17)

The present invention relates to film magazines and more particularly to a magazine capable of holding unexposed film in a mounted condition ready for use and capable of being charged into a camera and discharged therefrom as a unit.

Heretofore, photographic films have been generally supplied to users on rolls which were charged into a camera for the taking of pictures. The user had to thread the film through the various parts of the camera before any pictures could be taken. This procedure was cumbersome and troublesome especially when applied to motion picture cameras of the amateur type. Various attempts have been made to remedy the shortcomings of prior rolls of film but none, as far as I am aware, has been commercially satisfactory and successful.

It is an object of my invention to provide a film magazine for cameras which overcomes the shortcomings noted hereinabove and which is especially suitable in connection with amateur motion picture cameras.

Another object of my invention is to provide a film magazine of a unitary character in which the supply of unexposed film is so arranged that the magazine as a unit need only be inserted into the camera and the film is ready for taking pictures.

A further object of my invention is to provide a film magazine for motion picture cameras of the amateur type in which mechanism is incorporated for maintaining loops at the supply and take-up spools and for automatically feeding a portion of film from the supply spool every time a portion of film is wound upon the take-up spool.

It is also within the contemplation of my invention to provide a film magazine of the character described which is simple in construction, economical to manufacture and practical to use.

Other objects and advantages will become apparent from the following description taken in conjunction with the accompanying drawings; in which:—

Fig. 4 is a view similar to Fig. 1 of modified embodiment of the invention; and

Fig. 5 illustrates an end elevation of the right side of the modified film magazine shown in Fig. 4.

Figure 1:
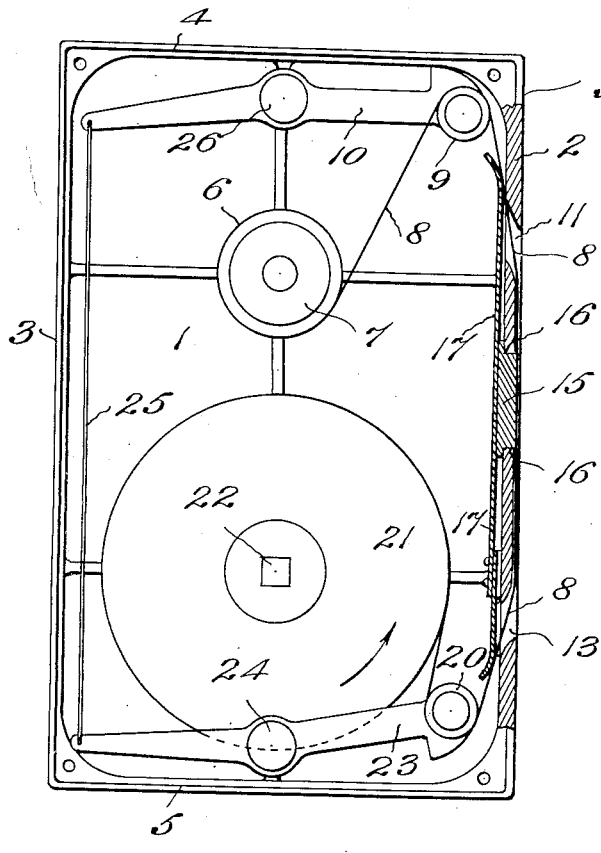
Fig. 1 illustrates a side elevation, partly in section, of a film magazine embodying my invention with the cover removed.

Referring more particularly to Fig. 1 the reference numeral M generally designates a hollow casing which is herein shown as having a rectangular shape. This casing has a closed bottom, 1, front and rear side walls, 2 and 3, and top and bottom side walls 4 and 5. All of the walls have a relatively shallow depth which is just a little greater than the depth or thickness of the film.

Mounted upon the bottom 1 of the casing is a supply spool 6 which rotates freely and which contains the supply of unexposed film 7. A strip 8 of unexposed film extends from supply spool 6 to and over a roller 9 which is secured to the end of a rocker arm 10 that is pivoted on pin 26. After passing over roller 9, the film strip 8 projects through a slot 11 which is provided in front wall 4.

On the outer face of wall 4, a depressed guide way 12 is located for the reception and holding of the film strip. The guide way 12 extends from slot 11 to a second slot 13 through which the film may re-enter the film casing.

In the middle of guide way 12, I prefer to cut a cavity 14 or other suitable form. The purpose of this cavity is to provide an escape for air trapped under the film so that the film can be seated properly in guide way 12. A further provision is made in the form of seating block 15 for the proper and exact seating of the film at an intermediate point of guide way 12 which is adapted to be placed in alignment with the picture window of the camera when the magazine is inserted in the camera. Seating block is shown herein as a relatively thin rectangular piece of metal held in a window 16 by a spring 17. The front face of the block contacts with the back of the strip of film and holds the film in its proper focal plane while the film is passing in front of the picture window of the camera.

The film may be moved through guide way 12 by any suitable mechanism provided in the camera for this purpose. In the present instance, a pilot port 18 and a claw slot 19 for the intermittent film moving mechanism is shown. Any other appropriate auxiliaries, of course, may be provided.

When the strip of film is moved by the intermittent mechanism, it passes through slot 13 over guide roller 20 and to take-up spool 21. This spool is driven by means of a square spindle 22 or the like which is secured to a driving pulley 23 located outside of the casing. During the operation of the camera pulley 23 is driven continuously by a driving pulley (not shown) which is provided with any of the well known slip friction clutches or the like.

Guide roller 20 is carried on one end of rocker arm 23′ which is pivoted on pin 24. The rear end of rocker arm 23 is operatively connected to the rear end of rocker arm 10 by a link 25, which is effective to transmit motion from one arm to the other and to cause the arms to work in unison, as will be explained more fully hereinafter.

The top of casing 1 is provided with a cover 27 which is fastened in place by any appropriate means such as a plurality of screws 28. In practice I have found that one screw in each corner is sufficient to hold the cover firmly in place, and to make the top of the casing light tight.

A modified embodiment of my invention is shown in Figs. 4 and 5. The magazine illustrated in these figures incorporates the basic principles of my invention but shows another exemplification thereof.

The magazine M¹ is provided with a casing 100 within which the film and all of the parts are housed. A cover 101 fits upon the top of the casing and is held in place by any suitable means such as a plurality of screws 102. In the present embodiment, a screw is provided for in each corner and is adapted to fit in a corner screw hole 103. Of course, the cover seals the top of the casing and makes the magazine light tight.

The lower part of the casing is preferably cast or made as an integral structure of some appropriate material. On the bottom 104 a plurality of cross webs 105 is provided to give strength and rigidity to the casing.

Surrounding the periphery of bottom of 104 is a plurality of upwardly extending sides 106. The top, rear and bottom sides are herein shown as being closed walls. The front side is provided with a window 107 which is adapted to be placed in alignment with the lens system of the camera. A small pilot port 108 is provided in the front wall below window 107. In alignment with pilot port 108 is a claw slot 109. The pilot port and claw slot are adapted to receive the mechanism provided in the camera for moving the film within the magazine casing and past window 107.

In the present embodiment of the invention, the film is housed completely within the magazine. Supply spool 110 is mounted in the upper part of the magazine upon a pin 111. A strip of film 112 extends from the supply spool over a guide roll 113 and behind a spring 114. This spring is secured to a hollow housing 115 in any suitable manner as by rivets or the like, and projects upward on the inside of the magazine to a point well above the upper end of window 107. By this arrangement the film is held snugly against the inner face of the front wall and in a plane behind the window 107 so that the film will always be in the proper focal plane with respect to the lens system of the camera. Furthermore, spring 114 extends practically across the entire width of the magazine so that the interior of the magazine is maintained in a light tight condition with regard to any light that might filter through window 107.

Figure 2:
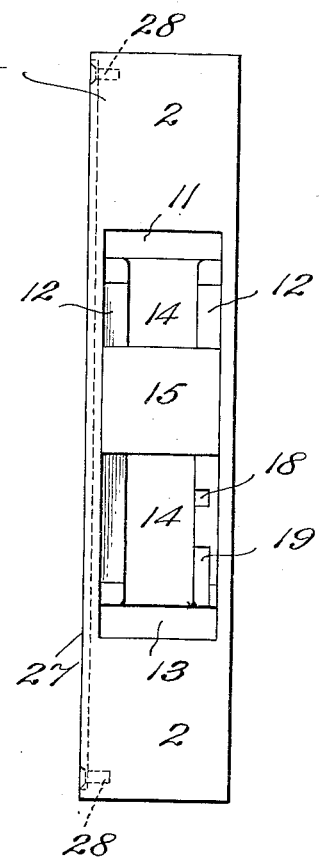
Fig. 2 is an end elevation of the right side of the film magazine shown in Fig. 1.
Figure 3:
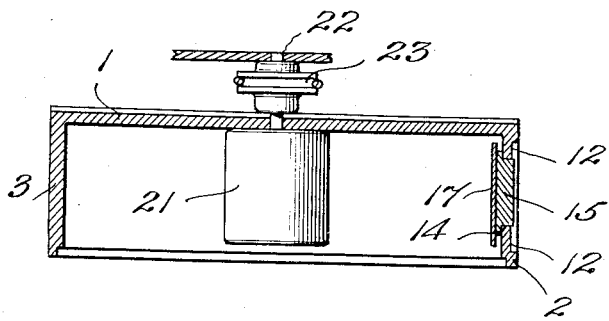
Fig. 3 depicts a sectional view taken on the line 3—3 of Fig. 1.

As the strip of film has passed through housing 115, a guiding lip 116 secured to the end of said housing directs the film to a guide roller 117. From the guide roller the film goes to a take-up spool 118. This take-up spool is driven by means of a square spindle 119, which is driven in the same manner as square spindle 22 shown in Figures 1 to 3. In view of the fact that the driving mechanism is square spindle 119 and is of the same type as described in connection with spindle 22, it is not necessary to repeat the description set forth in connection with spindle 22 at this point.

Guide rollers 113 and 117 are carried on the end of rocker arms 120 and 121. These arms are respectively pivoted on pins 122 and 123. A link 124, operatively connects the rear ends of rocker arms 120 and 121. Any suitable means may be provided for securing link 124 to arms 120 and 121 but in the present instance holes 125 and 126 are provided in arms 120 and 121 respectively for the reception of the end of link 124. By the provision of this structure rocker arms 120 and 121 operate in unison.

When the intermittent mechanism of the camera moves the strip of film 112 past window 107, the front end of arm 120 is moved downwardly. With this movement of arm 120, the rear thereof moves upwardly. Since link 124 is operatively connected with the rear end of arm 121, it carries the rear of this arm upwardly and the front end downwardly. As the front end of arm 121 moves downwardly, it carries a portion of the strip of film 112 with it. During each idle period of the intermittent feeding mechanism, the front end of arm 121 is moved upwardly by means of the action of take-up roll 118 which as is well known, is driven constantly through the agency of a slip or frictional clutch device.

When the front end of arm 121 is raised its rear is lowered thus drawing link 124 downwardly. When link 124 moves downwardly, the front of arm 120 is moved upwardly. With the upward movement of the front end of arm 120, roller 113 withdraws a portion of a strip of film 112 from the supply roll 110. After a fresh portion of film is drawn from supply roll 119, the intermittent mechanism again operates and the aforesaid motions and actions are repeated. In this manner, the intermittent feeding mechanism is relieved of the task of pulling off film directly from the supply spool and from being subjected to a pulling force of the take-up roll. In addition, loops of film are provided at each corner of the film magazine and at each side of the feeding mechanism.

It will be observed that my invention provides a film magazine of unitary structure in which the film is mounted and fixed in position within the magazine so that the user thereof is freed from the burden and necessity of threading the film through the various parts of the camera. In the case of motion picture film, particularly that film which is intended for use in amateur motion picture cameras it can be mounted very conveniently in my film magazine. When my magazine is used for amateur motion picture film, the entire magazine is prepared at the factory in a condition ready for use so that all that the user has to do is to insert the magazine in the camera. After the amateur motion pictures have been taken, the user then returns the film magazine with the exposed film to the factory which develops the film and reloads the magazine with fresh film. It is apparent that my film magazine facilitates the taking of motion pictures by amateurs and thus makes it possible for anybody to make use of amateur motion picture cameras.

It will also be noticed that my invention provides a film magazine which has a casing that can be die-cast of some suitable alloy or of bakelite or some other appropriate material so that a compact light, durable and rigid structure is made available to the public.

Although I have illustrated and described certain preferred embodiments of my invention, it is to be noted that the invention is not limited thereto and that any other modification or variation may be resorted to without departing from the spirit and scope of my invention as defined in the appended claims. For instance, the rocker arms can be mounted upon the pins carrying the supply and take-up spools and the rear ends of the arm can be joined directly together instead of through the agencies of a separating link. Then again various spring devices and film holding mechanisms can be provided for directing the film in its travel through the interior of the magazine.

What is claimed is:

1. A film magazine of unitary structure which comprises a light tight casing having a picture window and openings for film feeding mechanism in the front wall thereof, film supply and take-up spools mounted within said casing, means for guiding the film from the supply spool past the picture window and to the take-up spool and a pair of operatively connected rocker arms adapted to be actuated by the movement of the film when moved by the feeding mechanism whereby one of said arms is adapted to be actuated by the movement of the film and whereby one of said arms is adapted to withdraw a portion of the strip of film as it passes the picture window under the action of the feeding mechanism and the other of said arms is adapted to withdraw a fresh portion of unexposed film from the supply spool every time the take-up winds up the portion of exposed film withdrawn past the picture window.

2. A film magazine of unitary character comprising a relatively thin hollow casing having a light tight top, rear and bottom walls and having a front wall provided with a picture window and openings for a film feeding mechanism of the camera, film supply spool mounted in one part of said casing, a film take-up spool mounted in another part of said casing, a guide way including a leaf spring associated with the inner face of the front wall of the casing, a rocker arm located adjacent to the film supply spool, a guide roller mounted on the front end of said rocker arm, a second rocker arm operatively associated with said take-up spool, a guide roller mounted on the front end of said second rocker arm, and a means operatively connecting the rear ends of said rocker arms whereby said arms operate in unison when film extends from said supply spool over a guide roller on the one arm through the film guide way associated with the front wall of the casing and around the guide roller on said second arm so that every time the film feeding mechanism feeds film past the picture window, the rocker arm associated with the take-up roll will withdraw fed portion of film and so that when the take-up spool takes up the said exposed portion of film, the rocker arm associated with the film supply spool will withdraw a fresh portion of unexposed film.

3. A film magazine of unitary character which comprises a relatively thin rectangular casing provided with a removable top and provided with a picture window and openings for a film feeding mechanism on the front wall thereof, a supply spool rotatively mounted in the upper part of said casing, a rocker arm, located adjacent to and operatively associated with said film supply spool, a film guiding means mounted on the front portion of said arm, a film guide-way including a spring associated with the inner face of the front wall of said casing, a take-up spool rotatively mounted in the lower portion of said casing, a second rocker arm located adjacent to and operatively associated with said take-up spool, a film guiding means positioned on the front end of said rocker arm and a link operatively connecting the rear ends of said rocker arms whereby said arms operate in unison when film extends from said supply spool over a guide roller on the one arm through the film guide way associated with the front wall of the casing and around the guide roller on said second arm so that every time the film feeding mechanism feeds film past the picture window, the rocker arm associated with the take-up roll will withdraw fed portion of film and so that when the take-up spool takes up the said exposed portion of film, the rocker arm associated with the film supply spool will withdraw a fresh portion of unexposed film.

4. A film magazine of unitary character which comprises a hollow casing having a picture window and film aperture, film supply and take-up spools in said casing, spaced pivoted connected elements disposed respectively adjacent said spool and engaging the film and actuated by the movement of the film to withdraw a portion of the film from the picture window whenever the feed mechanism functions and to draw a fresh portion of unexposed film from the supply spool as the take-up spool winds up the exposed film.

5. A film magazine of unitary character which comprises a hollow light tight casing having a picture window and film apertures, film supply and take-up spools disposed within said casing, means for guiding the strip of film from the supply spool past the picture window to the take-up spool and spaced connected pivoted elements respectively disposed adjacent the take-up and supply spools and engaging said film, said elements actuated by the movement of the film to withdraw a portion of the film from the window as the feed mechanism functions and to draw a fresh portion of unexposed film from the supply spool as the take-up spool winds up the exposed film.

6. A film magazine of unitary character which comprises a hollow light tight casing having a picture window and apertures for film feed mechanism provided in a wall thereof, film supply and take-up spools mounted in operative relation to each other within the casing, means for guiding the strip of film from the supply spool past to the picture window to the take-up spool, resilient means engaging the film to hold it in its proper focal plane at the picture window and spaced pivoted connected elements disposed respectively adjacent the take-up and supply spools and engaging the film, said elements actuated by the movement of the film to draw a portion of film from the picture window as the feed mechanism functions and to draw a fresh portion of unexposed film from the supply spool every time the take-up spool winds up a portion of the exposed film.

7. A film magazine of unitary character which comprises a hollow light tight casing having a picture window and apertures having film feed mechanism provided in the wall thereof, film supply and take-up spools mounted in operative relation to each other within said casing, means for guiding the strip of film from the supply spool past the picture window to the take-up spool, resilient means for holding the film in its proper focal plane at the picture window, means associated with the interior face of the front wall for making the picture window and aperture for the film feed mechanism light tight, spaced pivoted connected elements disposed respectively adjacent the supply and take-up spools and engaging the film, said elements actuated by the movement of the film to withdraw a portion of the film from the picture window every time the feed mechanism functions and to withdraw a fresh portion of unexposed film from the supply spool every time the take-up spool winds up a portion of exposed film.

8. A film magazine of unitary character which comprises a relatively thin rectangular casing provided with a removable top and provided with a picture window and openings for a film feeding mechanism on the front wall thereof, a supply spool rotatively mounted in the upper part of said casing, a rocker arm located adjacent to and operatively associated with said film supply spool, a film guiding means mounted on the front portion of said arm, a film guide-way including a spring associated with the inner face of the front wall of said casing, a take-up spool rotatively mounted in the lower portion of said casing, a second rocker arm located adjacent to and operatively associated with said take-up spool, a film guiding means positioned on the front end of said rocker arm and means operatively connecting the rear ends of said rocker arms whereby said arms operate in unison when film extends from said supply spool over a guide roller on the one arm through the film guide way associated with the front wall of the casing and around the guide roller on said second arm so that every time the film feeding mechanism feeds film past the picture window, the rocker arm associated with the take-up roll will withdraw fed portion of film and so that when the take-up spool takes up the said exposed portion of film, the rocker arm associated with the film supply spool will withdraw a fresh portion of unexposed film.

9. A film magazine of unitary character comprising a relatively thin hollow casing having a light tight top, rear and bottom walls and having a front wall provided with a picture window and openings for a film feeding mechanism of the camera, film supply spool mounted in one part of said casing, a film take-up spool mounted in another part of said casing, a guide way including a leaf spring associated with the inner face of the front wall of the casing, a rocker arm located adjacent to the film supply spool, a guide roller mounted on the front end of said rocker arm, a second rocker arm operatively associated with said take-up spool, a guide roller mounted on the front end of said second rocker arm, and a link operatively connecting the rear ends of said rocker arms whereby said arms operate in unison when film extends from said supply spool over a guide roller on the one arm through the film guide way associated with the front wall of the casing and around the guide roller on said second arm so that every time the film feeding mechanism feeds film past the picture window, the rocker arm associated with the take up roll will withdraw fed portion of film and so that when the take-up spool takes up the said exposed portion of film, the rocker arm associated with the film supply spool will withdraw a fresh portion of unexposed film.

10. A film magazine of unitary character comprising a relatively thin hollow casing having a light tight top, rear and bottom walls and having a front wall provided with a picture window and openings for a film feeding mechanism of the camera, film supply spool mounted in one part of said casing, a film take-up spool mounted in another part of said casing, a film guiding means including resilient means associated with the inner face of the front wall of the casing, a rocker arm located adjacent to the film supply spool, a guide roller mounted on the front end of said rocker arm, a second rocker arm operatively associated with said take-up spool, a guide roller mounted on the front end of said second rocker arm, and means operatively connecting the rear ends of said rocker arms whereby said arms operate in unison when film extends from said supply spool over a guide roller on the one arm through the film guide way associated with the front wall of the casing and around the guide rollers on said second arm so that every time the film feeding mechanism feeds film past the picture window, the rocker arm associated with the take-up roll will withdraw fed portion of film and so that when the take-up spool takes up the said exposed portion of film, the rocker arm associated with the film supply spool will withdraw a fresh portion of unexposed film .

11. A film magazine of unitary character comprising a take-up and a supply spool for film therein, a pivoted rocker arm adjacent the supply spool, a film guide mounted on one end thereof, a second pivoted rocker arm disposed adjacent the take-up spool and having a film guide on one end thereof, the film passing over said guides respectively as it leaves the supply spool and before it reaches the take-up spool, the opposite ends of said rocker arms being connected.

EDWIN STANTON PORTER.